(12) United States Patent
Yamada

(10) Patent No.: US 11,525,424 B1
(45) Date of Patent: Dec. 13, 2022

(54) CHARGE-AIR COOLER AND METHOD TO REDUCE WATER INDUCTION IN ENGINE

(71) Applicant: FORD GLOBAL TECHNOLOGIES, LLC, Dearborn, MI (US)

(72) Inventor: Shuya Shark Yamada, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/467,723

(22) Filed: Sep. 7, 2021

(51) Int. Cl.
*F02M 31/20* (2006.01)
*F16K 15/03* (2006.01)
*F02M 35/10* (2006.01)
*F02M 35/104* (2006.01)

(52) U.S. Cl.
CPC .......... *F02M 31/20* (2013.01); *F02M 35/104* (2013.01); *F02M 35/10255* (2013.01); *F16K 15/033* (2013.01)

(58) Field of Classification Search
CPC ............. F02M 31/20; F02M 35/10255; F02M 35/104; F16K 15/033
See application file for complete search history.

(56) References Cited

U.S. PATENT DOCUMENTS

| | | | |
|---|---|---|---|
| 8,783,233 B2 * | 7/2014 | Cockerill | F02M 35/108 123/542 |
| 9,222,447 B2 * | 12/2015 | Yamada | F02B 29/0418 |
| 9,617,909 B2 | 4/2017 | Styles et al. | |
| 9,890,691 B2 | 2/2018 | Banker et al. | |
| 9,920,686 B2 | 3/2018 | Somhorst et al. | |
| 2013/0000611 A1 * | 1/2013 | Vigild | F02B 29/0418 123/542 |

FOREIGN PATENT DOCUMENTS

FR 2925351 B1 11/2010

* cited by examiner

*Primary Examiner* — Syed O Hasan
(74) *Attorney, Agent, or Firm* — Vincent Mastrogiacomo; Brooks Kushman P.C.

(57) ABSTRACT

An engine system includes an intake manifold and a charge-air cooler disposed upstream of the intake manifold. The charge-air cooler includes a housing defining an enclosure having a water reservoir, a heat exchanger disposed within the enclosure, and a valve disposed within the enclosure. The valve has a flap that is movable between an open position in which airflow is permitted across the water reservoir and a closed position is which airflow across the water reservoir is inhibited.

17 Claims, 3 Drawing Sheets

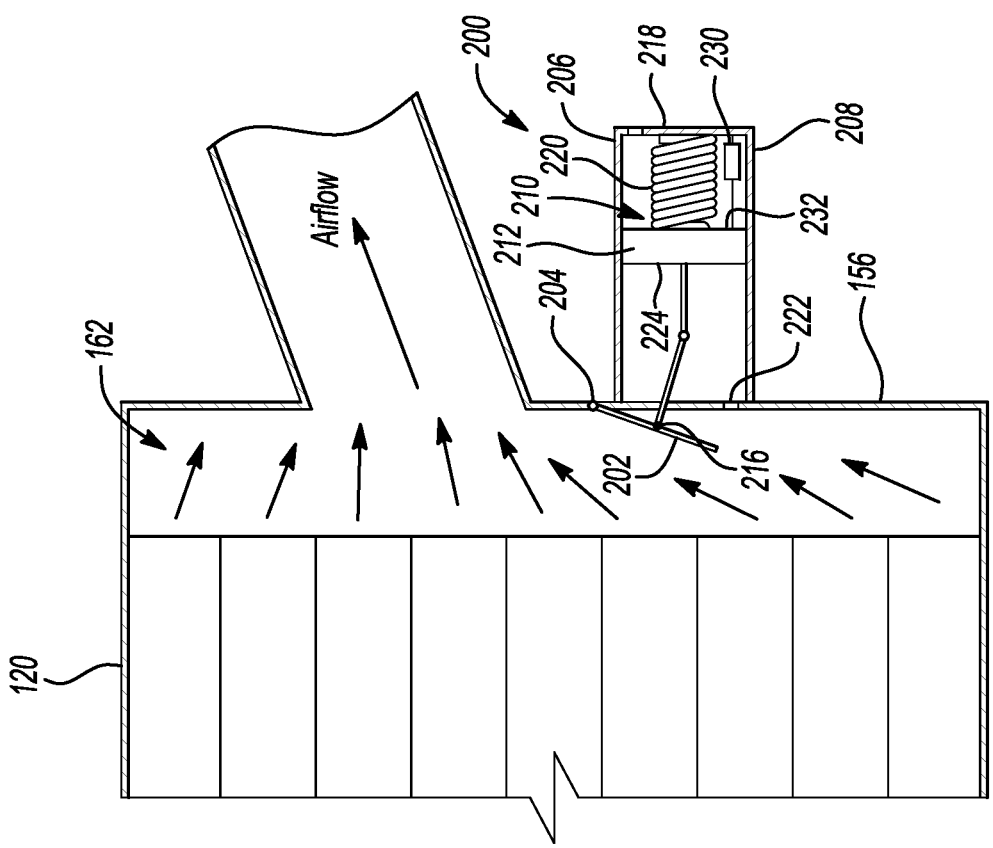
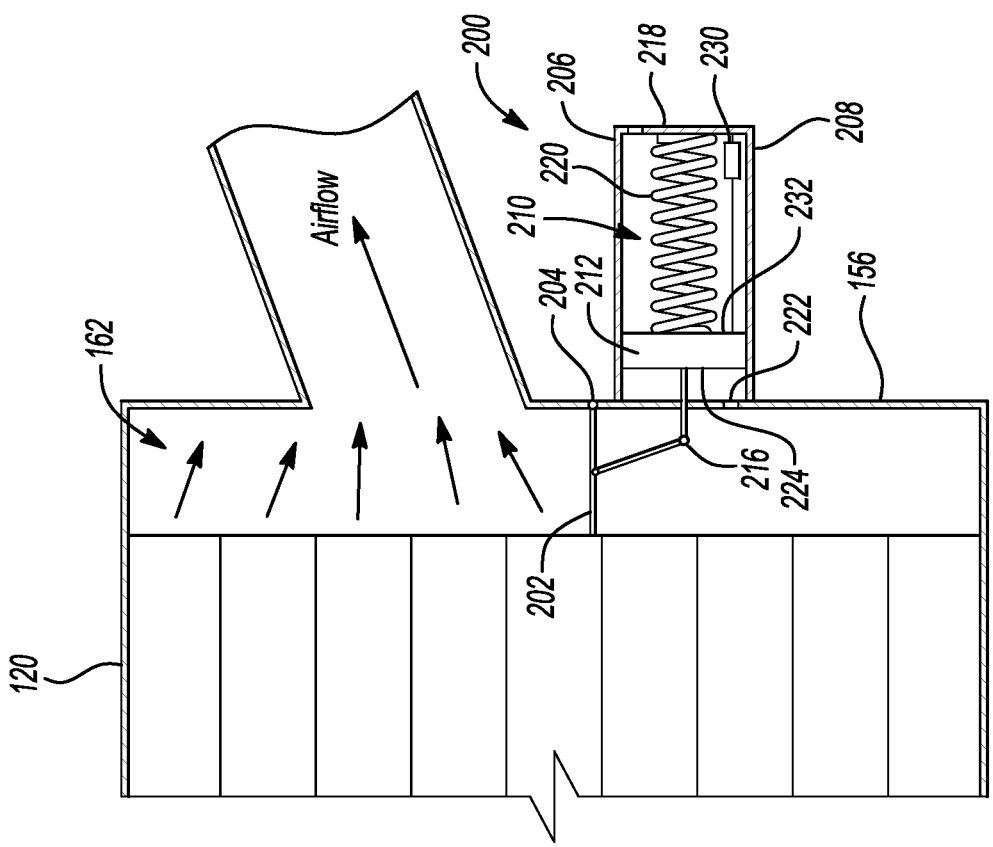

CHARGE-AIR COOLER AND METHOD TO REDUCE WATER INDUCTION IN ENGINE

TECHNICAL FIELD

This disclosure relates to charge-air coolers designed to reduce the rate of water induction into an engine.

BACKGROUND

Turbocharged and supercharged engines may be configured to compress ambient air entering the engine in order to increase power. Because compression of the air may cause an increase in temperature of the air, a charge-air cooler (sometimes called an intercooler) may be utilized to cool the heated air thereby increasing its density and further increasing the potential power of the engine.

SUMMARY

According to one embodiment, an engine system includes an intake manifold and a charge-air cooler disposed upstream of the intake manifold. The charge-air cooler includes a housing defining an enclosure having a water reservoir, a heat exchanger disposed within the enclosure, and a valve disposed within the enclosure. The valve has a flap that is movable between an open position in which airflow is permitted across the water reservoir and a closed position is which airflow across the water reservoir is inhibited.

According to another embodiment, a charge-air cooler includes a housing having a first wall defining an inlet connectable to a compressor, a second wall defining an outlet connectable to an intake manifold, and an enclosure at least partially bounded by the first and second walls and having a bottom cooperating with at least the first and second walls to form a water reservoir. A heat exchanger is disposed in the enclosure such that a void space is defined between a downstream end of the heat exchanger and the second wall of the housing. A valve is supported on the second wall above the water reservoir and below the outlet. The valve includes a flap having a closed position in which the flap extends from the second wall towards the downstream side of the heat exchanger to partition a lower portion of the void space from the outlet to inhibit induction of water into the outlet, and having an open position in which the void space is not partitioned to permit induction of water to the outlet.

According to yet another embodiment, a method of reducing water induction from a charge-air cooler into an engine includes biasing a flap of a valve to a closed position in which the flap blocks an airflow path from a water reservoir of the charge-air cooler to the engine to inhibit induction of water into the engine and, responsive to boost pressure within the charge-air cooler exceeding a threshold, moving the flap from the closed position towards an open position in which the flap is at least partially outside of the airflow path to permit induction of water into the engine.

BRIEF DESCRIPTION OF THE DRAWINGS

FIG. 3A is a diagrammatical side view of an example water-controlled valve shown in the closed position.
FIG. 3B is a diagrammatical side view of the example water-controlled valve shown in the open position.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

If the humidity of the ambient air is high, the air is cold, and/or the engine is equipped with exhaust gas recirculation (EGR), condensation (e.g., water droplets) may form on any internal surface of the charge-air cooler that is cooler than the dew point of the air. This condensed water may be collected in a water reservoir. This water, either liquid or vapor, may be drawn into the engine the combustion chambers resulting in engine misfire, loss of torque and engine speed, hydro-lock, or incompletely burned fuel, for example. As we described in detail below, disclosed is a charge-air cooler having a valve that controls the amount of water entering the engine to drain the water from the charge-air cooler while also preventing poor engine performance. For example, the valve may be controlled to allow water to enter the engine during heavy load where sufficient air and fuel is present to process the water without issue and to limit the amount of water entering the engine during low load where excessive water may reduce engine performance.

Figure 1:
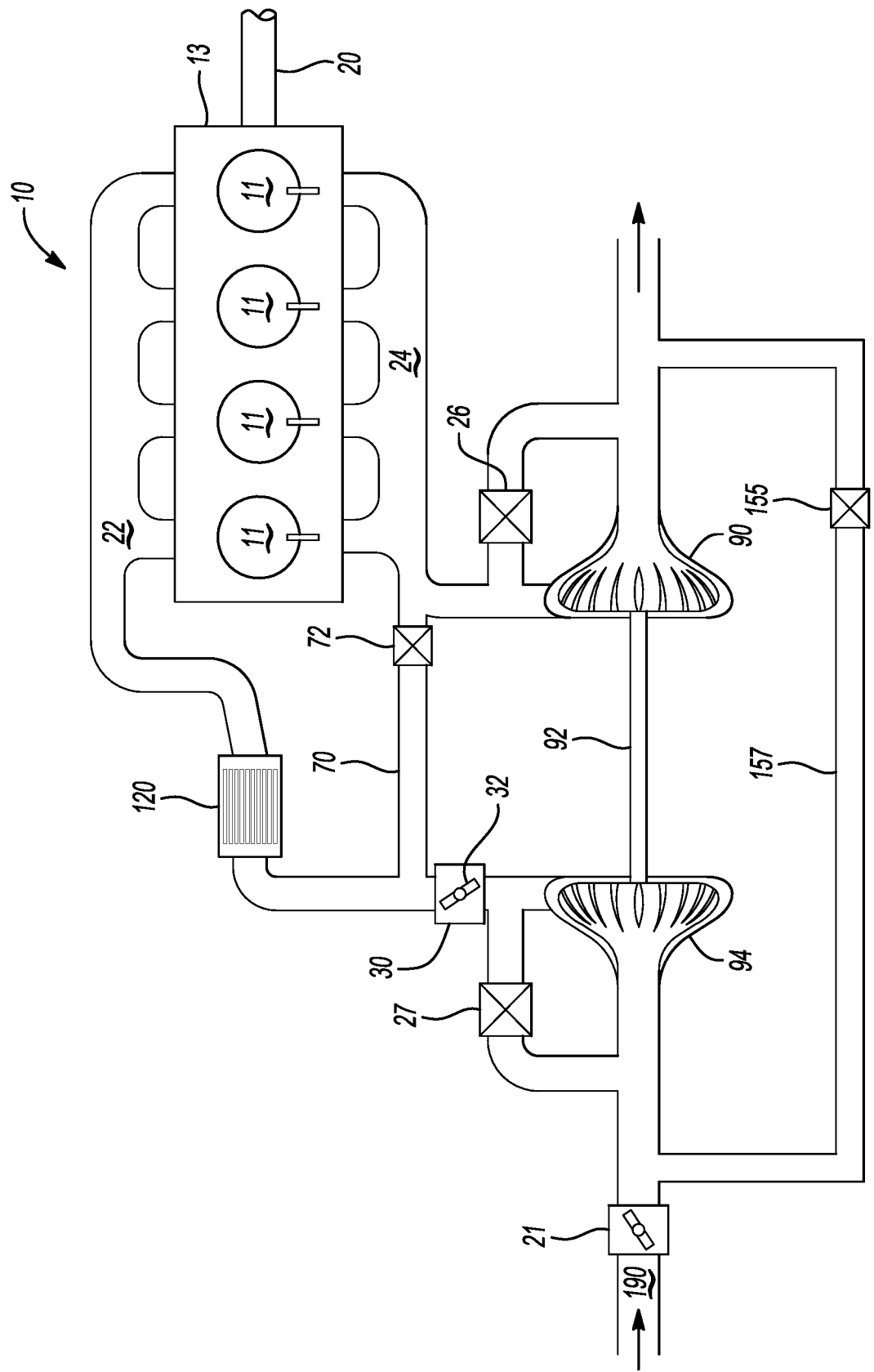
FIG. 1 is a diagrammatical view of an engine system.

Referring to FIG. 1, an engine system 10 may be a diesel engine, a gasoline engine, or other type of engine that may utilize various components in accordance with the present disclosure. The system 10 includes an internal-combustion engine 13 having a plurality of cylinders 11. The engine 10 is controlled by an engine controller sometimes referred to as an ECM or PCM. Engine 10 includes pistons positioned within the cylinders 11 and connected to a crankshaft 20. The combustion chambers communicate with an intake manifold 22 and an exhaust manifold 24 via respective intake and exhaust valves.

The intake manifold 22 communicates with a throttle body 30 via a throttle plate 32. In one embodiment, an electronically controlled throttle can be used. While throttle body 30 is depicted as being downstream of a compressor device 94, it will be appreciated that the throttle body 30 may be placed upstream or downstream of the compressor 94. Alternatively, or additionally, a throttle body 30 may be placed in the air induction tube upstream of the compressor or in the exhaust line to raise exhaust pressure.

The engine system 10 may include an exhaust gas recirculation (EGR) system to help lower NOx and other emissions. For example, the engine 10 may include a high-pressure EGR system in which exhaust gas is delivered to the intake manifold 22 by a high-pressure EGR passage 70 communicating with the exhaust manifold 24 at a location upstream of a turbine 90 of a compression device, e.g., a turbocharger, and communicating with the intake manifold 22 at a location downstream of the compressor 94. A high-pressure EGR valve assembly 72 may be located in high-pressure EGR passage 70. Exhaust gas may then travel from exhaust manifold 24 first through high-pressure EGR passage 70, and then to the intake manifold 22. The amount of EGR provided to the intake passage 190, upstream of throttle body 30 and downstream of a charge-air cooler 120, may be varied by the controller via an EGR valve, such as the high-pressure EGR valve 72. An EGR cooler (not shown) may be included in high-pressure EGR tube 70 to cool re-circulated exhaust gases before entering the intake manifold. Cooling may be done using engine coolant, but an air-to-exhaust gas heat exchanger may also be used.

FIG. 1 also shows a low-pressure EGR system where EGR is routed from downstream of the turbine 90 to upstream of the compressor 94 through a low-pressure EGR passage 157. A low-pressure EGR valve 155 may control the amount of EGR provided to the intake passage 190. In some embodiments, the engine may include both a high-pressure EGR and a low-pressure EGR system, as shown in FIG. 1. In other embodiments, the engine may include either a low-pressure EGR system or a high-pressure EGR system or none. When operable, the EGR system may increase the formation of condensate as it increases the water vapor concentration in the charge air, particularly when the charge air is cooled by the charge-air cooler.

Compression device may be a turbocharger (as shown), a supercharger, or the like. The depicted compression device may have a turbine 90 coupled with the exhaust manifold 24 and a compressor 94 coupled with the intake manifold 22 via a charger-air cooler (intercooler) 120, which may be an air-to-air heat exchanger, but could also be liquid cooled. The turbine 90 is typically coupled to the compressor 94 via a drive shaft 92. The speed of the turbine 90 may be controlled by a wastegate 26. A sequential turbocharger arrangement, single VGT, twin VGTs, or any other arrangement of turbochargers could be used and could include coolers within the compression device system, such as between two stages of compression.

The intake passage 190 may include an air-intake control valve 21. Additionally, the intake passage 190 may include a compressor bypass or recirculation valve (CRV) 27 configured to divert intake air around the compressor 94. The wastegate 26 and/or the CRV 27 may be controlled by the controller to be opened when a lower boost pressure is desired, for example. For example, in response to compressor surge or a potential compressor surge event, the controller may open the CRV 27 to decrease pressure at the outlet of the compressor 94. This may reduce or stop compressor surge. Additionally or alternatively, the CRV 27 and/or the wastegate 26 may be opened to decrease a pressure in the charge-air cooler 120 and as a result, reduce condensate formation in the charge-air cooler.

The compressor 94 may be upstream of the charge-air cooler 120 to provide a compressed air charge to the charge-air cooler 120. The charge-air cooler 120 may be used to decrease the temperature of the turbocharged or supercharged compressed gas mixture. The charge-air cooler 120 may be an air-to-air cooler or a liquid-to-air cooler.

As explained above, condensate may accumulate in the charge-air cooler and pool at the bottom. This water may be swept to the engine, where it can cause combustion instability or hydro-lock if the water induction rate is too high. As will be described in more detail below, the charge-air cooler 120 includes a valve to control the amount of condensed water drawn into the engine 13. This allows for automatic draining while also avoiding combustion issues.

Figure 2:
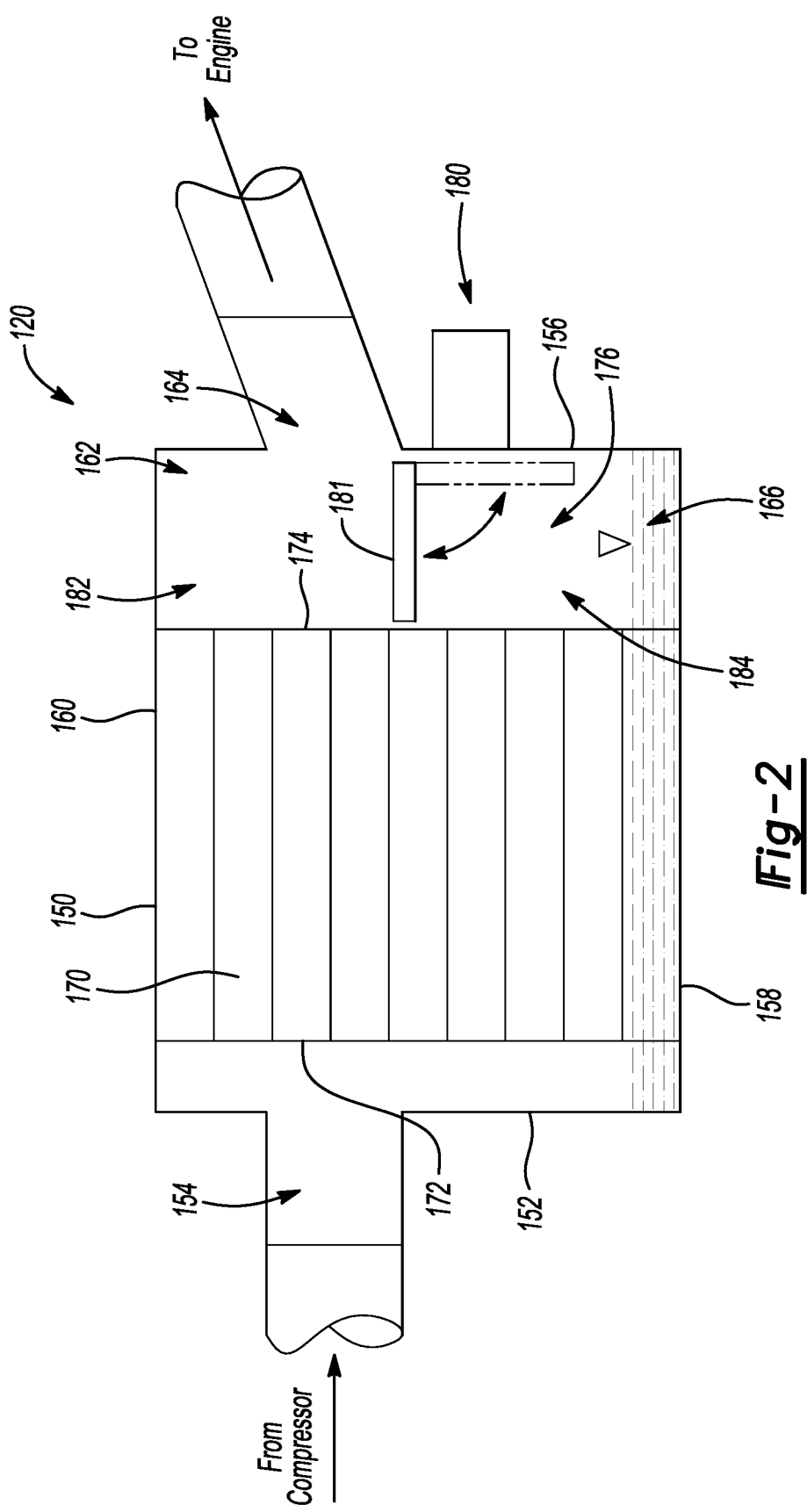
FIG. 2 is a diagrammatical side view of a charge-air cooler having a water-control valve.

Referring to FIG. 2, the charge-air cooler 120 includes a housing 150 having a downstream wall 152 defining an inlet 154, an upstream wall 156 defining an outlet 164, a bottom 158, a top 160, and sidewalls cooperating to define an enclosure or cavity 162. The walls and the bottom 158 cooperate to define a lower area that serves as a water reservoir 166. Due to gravity, any water that is condensed it within the charge-air cooler 120 generally drains to the bottom and is collected in the water reservoir 166.

A heat exchanger 170 is disposed within the cavity 162. The heat exchanger 170 is disposed in the airflow path between the inlet 154 and the outlet 164. During operation, the hot air charge flows from the inlet 154, through the heat exchanger 170, and out of the outlet 164. The heat exchanger 170 extracts heat from the air passing therethrough to cool the air charge prior to the engine. Cooling the air charge reduces the density of the air allowing the engine to make more power as is known in the art. As discussed above, the heat exchanger 170 may be an air-to-air heat exchanger or an air-to-liquid heat exchanger. The heat exchanger includes a downstream side 172 that is spaced apart from the wall 152 and an upstream side 174 that is spaced apart from the wall 156. The upstream wall 156 and the upstream side 174 cooperate to define a void space 176 that generally extends from the bottom 158 to the top 160. The void space 176 is also adjacent to the outlet 164.

During operation of the engine, the airflow through the charge-air cooler 120 may carry water with it to the engine. The engine is capable of combusting a certain amount of water without issue, however, excess water can create combustion instability. Within the enclosure 162, pressurized air traveling over the water may carry water up the void space into the outlet 64 and then to the engine. To control this, a valve 180 is provided.

The valve 180 may be supported on the upstream wall 156 (or other portion of the housing 150) and includes a flap 181 generally disposed within the void space 176. The flap 181 is pivotal relative to the wall 156 between a closed position (shown in solid) and an open position (shown in phantom). The flap 181 is pivotally attached to the wall 156 below the outlet 164 and above the water reservoir 166. When in the closed position, the flap 181 partitions the void space 176 into an upper portion 182 and a lower portion 184. The closed flap acts as a barrier to prevent water from sweeping upwardly from the water reservoir 166 and out the outlet 164. That is, the closed flap changes the flow dynamics within the enclosure 162 causing a majority of the flow to be concentrated towards the upper half of the enclosure and away from the water. Airflow through the upper portion of the enclosure 162 picks up a limited or negligible amount of water. The flap 181 may be biased towards the closed position by a resilient member or the like.

The flap 181 is generally outside of the void space 176 when in the open position allowing full functionality of the charge-air cooler 120 and permitting automatic draining of the stored water through induction into the engine. The flap 181 is moved from the closed position to the open position by pivoting the flap 181 downwardly towards the wall. When in the open position, the flap 181 may be disposed adjacent or on the wall 156.

The valve 180 may be a passive valve that operates based on pressure within the enclosure 162. The flap 181 is biased to the closed position and moves to the open position responsive to the boost pressure within the enclosure 162 exceeding one or more thresholds. That is, when the boost pressure is less than a threshold, the valve is in the closed position, and, when the boost pressure is greater than a threshold, the valve moves towards the open position. To prevent an immediate transition from the closed to opened, which may induct excessive water, the valve 180 is configured to limit the rate of movement of the flap 181 so that the valve opens slowly in a time-delayed manner. For example, the flap may be designed to fully open in 3 to 8 seconds.

The valve 180 includes a damper that exerts a force opposite the direction of movement to rate limit opening of the flap 181. The damper is configured such that the flap is moved from the closed position to the open position over a predetermined time window, e.g., 3 to 8 seconds. The damper may be a hydraulic damper, e.g., a shock absorber. A hydraulic damper is merely one example and other types of mechanisms, e.g., pneumatic, may be used to dampen flap movement so that the valve slowly opens according to the predetermined time window.

FIGS. 3A and 3B illustrate an example embodiment of the valve 180 according to one or more embodiments. The example valve 200 is actuated based on boost pressure within the charge-air cooler 120. The valve 200 includes a flap 202 that is pivotally connected to the wall 156 by a hinge 204 or the like. An actuation mechanism 206 is configured to pivot the flap 202 between the open position (FIG. 3A) and the closed position (FIG. 3B) based on pressure within the charge-air cooler 120. The actuation mechanism 206 of the valve 200 may be disposed external to the housing of the cooler 120.

The actuation mechanism 206 may include a cylinder 208 defining a cylindrical interior 210. Disposed within the interior 210 is a piston 212 that is operably coupled to the flap 202. For example, one or more linkages 214 and pivot points 216 mechanically couple of the flap 202 to the piston 212. The piston 212 is axially movable within the interior 210, e.g., by sliding along the cylinder wall. The piston 212 may include a seal for creating an air-tight (or mostly air-tight) seal with the cylinder wall. The flap 202 is in the closed position when the piston 212 is nearest to the wall 156. Moving the piston 212 towards an end plate 218 causes the flap 202 to pivot to the open position. The piston 212 is biased towards the wall 156 by a resilient member, e.g., spring 220. The spring 220 may be a coil spring that acts between the piston 212 and the end plate 218. The spring 220 biases the flap 202 to the closed position. The spring 220 may be a linear-force spring in which the spring force is constant regardless of the state of the spring. Or, the spring may be non-linear and generate greater spring force as the spring compresses.

The actuation mechanism 206 is a passive device that relies on pressure, i.e., boost pressure, within the charge-air cooler 120. An orifice 222 connects a front side 224 of the piston in fluid communication with the enclosure 162 of the charge-air cooler 120 so that the front side 224 of the piston 212 and the enclosure 162 are substantially at the same pressure. The piston 212 axially slides towards the end plate 218 responsive to the pressure exceeding the force of the spring 220 causing the valve 200 to open. To rate-limit opening of the flap 202, a damper 230 is provided to slow the piston 212. The damper 230 may be a shock absorber that acts between the backside 232 of the piston 212 and the end plate 218. The damper 230 creates the above-described time delay in moving of the flap 202 from the closed position to the open position.

During operation of the vehicle, the flap 202 is in the closed position initially and remains closed until the driver requests a relatively large driver-demanded torque. This driver-demanded torque results in increased boost from the turbocharger thus creating higher pressure within the charge-air cooler 120. If the pressure within the enclosure 162 exceeds a threshold (i.e., the air pressure creates sufficient force to compress the spring 220), the actuator 206 begins to open the flap 202.

When the flap 202 is in the closed position, most of the airflow within the charge-air cooler 120 is at the top half above the flap 202 as shown by the arrows in FIG. 3A. Once the flap 202 opens, the airflow travels throughout all or most of the cavity 162 as shown in FIG. 3B. When the flap 202 is open, the airflow across the water reservoir 166 automatically drains the charge-air cooler 120 by inducting water into the engine in a controlled manner that does not create combustion instability.

The actuator mechanism is not limited to a piston design and any actuator operable to pivot a flap, responsive to pressure change, may be used. In an alternative embodiment, a diaphragm may be used to sense pressure change and pivot the flap. Here, a spring may bias the diaphragm such that the flap is in the closed position. A damper may be connected to the diaphragm to limit the rate of opening.

In other embodiments, the valve may include an electric actuator that is controlled according to signals from a vehicle controller. Here, the actuator may include a motor or other device that is configured to pivot the flap between open and closed positions.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An engine system comprising: an intake manifold; and a charge-air cooler disposed upstream of the intake manifold and including:

a housing defining an enclosure having a water reservoir, wherein the housing has a wall defining an outlet, a heat exchanger disposed within the enclosure, wherein the wall is spaced apart from the heat exchanger creating a void space adjacent to the outlet, and a valve disposed within the enclosure and having a flap that is pivotable relative to the wall between an open position in which airflow is permitted across the water reservoir and a closed position is which airflow across the water reservoir is inhibited, wherein the flap is pivotable relative to the wall such that the flap at least partially blocks an airflow path from the water reservoir to the outlet when in the closed position to inhibit water from entering the outlet and the flap is outside of the airflow path when in the open position to permit the water to flow through the outlet, and the flap is configured to extend between the wall and the heat exchanger to partition the void space when in the closed position.

2. The engine system of claim 1, wherein the flap is biased to the closed position.

3. The engine system of claim 2, wherein the valve is a passive valve, and the flap is configured to move from the closed position toward the open position responsive to boost pressure within the enclosure exceeding a threshold.

4. The engine system of claim 3, wherein the valve includes a damper operably coupled to the flap and configured to limit a rate of movement of the flap towards the open position when the boost pressure exceeds the threshold.

5. The engine system of claim 4, wherein the valve includes a spring that biases the flap to the closed position.

6. The engine system of claim 4, wherein the damper is configured such that the flap moves from the closed position to the open position in a predetermined window of time responsive to the boost pressure exceeding the threshold.

7. The engine system of claim 1, wherein the valve includes a piston operably coupled to the flap.

8. The engine system of claim 1 further comprising a compressor disposed upstream of the charge-air cooler, wherein the charge-air cooler is configured to receive a hot compressed air charge from the compressor and to output a colder compressed air charge to the intake manifold.

9. A charge-air cooler comprising:
   a housing including a first wall defining an inlet connectable to a compressor, a second wall defining an outlet connectable to an intake manifold, and an enclosure at least partially bounded by the first and second walls and having a bottom cooperating with at least the first and second walls to form a water reservoir;
   a heat exchanger disposed in the enclosure such that a void space is defined between a downstream end of the heat exchanger and the second wall of the housing; and
   a valve supported on the second wall above the water reservoir and below the outlet, the valve including a flap having a closed position in which the flap extends from the second wall towards the downstream end of the heat exchanger to partition a lower portion of the void space from the outlet to inhibit induction of water into the outlet, and having an open position in which the void space is not partitioned to permit induction of water to the outlet.

10. The charge-air cooler of claim 9, wherein the flap is biased to the closed position.

11. The charge-air cooler of claim 10, wherein the valve is a passive valve, and the flap is configured to move from the closed position to the open position responsive to boost pressure within the enclosure exceeding a threshold.

12. The charge-air cooler of claim 11, wherein the valve includes a damper operably coupled to the flap and configured to limit a rate of movement of the flap towards the open position.

13. The charge-air cooler of claim 9, wherein the valve includes an actuator having:
   a cylinder in fluid communication with the enclosure,
   a piston slidably disposed within the cylinder and operably coupled to the flap such that movement of the piston opens and closes the flap,
   a spring acting between an end of the cylinder and the piston to bias the flap towards the closed position, and
   a damper acting between the end of the cylinder and the piston to limit a rate of movement of the flap.

14. An engine system comprising:
   an intake manifold; and a charge-air cooler disposed upstream of the intake manifold and including: a housing defining an enclosure having a water reservoir, a heat exchanger disposed within the enclosure, and a passive valve disposed within the enclosure and having a flap movable between an open position in which airflow is permitted across the water reservoir and a closed position is which airflow across the water reservoir is inhibited and an actuation mechanism operably coupled to the flap, the actuation mechanism including a piston operably coupled to the flap and configured to move the flap towards the open position when the boost pressure exceeds the threshold, a spring acting on the piston and biasing the flap to the closed position, and a damper operably coupled to the flap and configured to limit a rate of movement of the flap to the open position.

15. The engine system of claim 14, wherein the spring is connected to the piston.

16. The engine system of claim 14, wherein the actuation mechanism further includes a cylinder, and the piston is slidably disposed in the cylinder.

17. The engine system of claim 14, wherein the damper is a shock absorber.

* * * * *